United States Patent [19]

Lillquist et al.

[11] Patent Number: 4,679,068
[45] Date of Patent: Jul. 7, 1987

[54] COMPOSITE VISIBLE/THERMAL-INFRARED IMAGING SYSTEM

[75] Inventors: Robert D. Lillquist; Joseph M. Pimbley; Thomas L. Vogelsong, all of Schenectady, N.Y.

[73] Assignee: General Electric Company, Schenectady, N.Y.

[21] Appl. No.: 758,981

[22] Filed: Jul. 25, 1985

[51] Int. Cl.$^4$ .......... H04N 5/33; H04N 9/07; H01L 25/00

[52] U.S. Cl. .......... 358/44; 358/48; 358/113; 250/332

[58] Field of Search .......... 358/44, 48, 81, 82, 358/113, 108, 109, 211, 213, 43, 212; 250/332, 334, 330

[56] References Cited

U.S. PATENT DOCUMENTS

| | | | |
|---|---|---|---|
| 3,588,347 | 6/1971 | Montone et al. | 358/113 |
| 3,717,724 | 2/1973 | Montgomery, III | 178/810 |
| 3,742,124 | 6/1973 | Wilson et al. | 358/81 |
| 3,748,471 | 7/1973 | Ross et al. | 250/333 |
| 3,763,357 | 10/1973 | Morton | 358/107 |
| 3,806,633 | 4/1974 | Coleman | 178/5.2 |
| 3,946,264 | 3/1976 | Crowell | 313/388 |
| 4,086,616 | 4/1978 | Catano et al. | 358/81 |
| 4,118,733 | 10/1978 | Sarson et al. | 358/109 |
| 4,162,052 | 7/1979 | Lamelot | 244/3.16 |
| 4,170,987 | 10/1979 | Anselmo et al. | 128/665 |
| 4,220,972 | 9/1980 | Geokezas et al. | 358/113 |
| 4,237,492 | 12/1980 | Roth et al. | 358/225 |
| 4,242,706 | 12/1980 | McCormack et al. | 358/213 |
| 4,325,083 | 4/1982 | Rouchon et al. | 358/228 |
| 4,423,325 | 12/1983 | Foss | 250/332 |
| 4,431,917 | 2/1984 | Gibbons | 250/332 |
| 4,443,813 | 4/1984 | Tabei | 358/44 |

FOREIGN PATENT DOCUMENTS 53-116729 12/1978 Japan .......... 358/113

OTHER PUBLICATIONS

"A Solid-State Color Image Sensor Using ZnSe—Zn$_{1-x}$Cd$_x$Te Heterojunction Thin-Film Photoconductor", by Terui, Yasuaki et al, IEEE ISSCC 80 Digest of Technical Papers, pp. 34–35; Feb. 1980.

Primary Examiner—James J. Groody
Assistant Examiner—Robert M. Bauer
Attorney, Agent, or Firm—Paul R. Webb, II; James C. Davis, Jr.

[57] ABSTRACT

Multispectral imaging apparatus for producing a composite visible/infrared image includes a wavelength-independent focus reflective optical system for focusing visible and infrared radiation from a scene onto a hybrid visible/infrared radiation detector. The detector comprises an array of visible radiation responsive elements interspersed with infrared radiation responsive elements and provides first and second output signals corresponding, respectively, to the visible and the infrared radiation impinging upon the detector. The first and second signals are converted to a visible black and white image of the scene and a step-tone false color infrared image of the scene. The images are combined in exact spatial registration to produce a composite image comprising a visible image of the scene which is highlighted by the infrared radiation emitted by the scene.

25 Claims, 7 Drawing Figures

COMPOSITE VISIBLE/THERMAL-INFRARED IMAGING SYSTEM

BACKGROUND OF THE INVENTION

This invention relates generally to multispectral imaging systems, and more particularly to imaging systems capable of producing a composite visible/thermal-infrared image of an object or scene.

The use of passive infrared (IR) thermal imaging (thermography) for applications such as non-destructive testing, medical diagnosis, surveillance and military target identification, and guidance and tracking applications has been hampered to some extent by the difficulty operators have in positively recognizing and locating objects in a thermal image. Even familiar objects are often difficult to recognize from images produced by the object's passively emitted thermal radiation in the infrared spectral region. Under the pressures of simulated or actual combat, even experienced pilots have been known to fire at a "hot" feature revealed by their FLIR (Forward Looking Infrared) display system without being able to identify the target. Similar problems occur whenever infrared images are interpreted without familiar visual cues. Even the highest resolution thermal imaging systems can do little to improve this situation because of fundamental differences in the behavior of matter in the visible and infrared spectral regions. For example, glass and water are transparent to the human eye, but are virtually opaque in the thermal infrared region. Paints and semiconductors are visually opaque, but are partially transparent in the infrared. A further complication is that all matter glows to some extent at infrared wavelengths, and an infrared image is, in effect, a radiant temperature map of a scene.

Multispectral imaging systems which produce a composite visual/infrared image of a scene are known. Such systems have the advantage of combining on a single display visual and thermal information, and are useful in enabling thermal features in a complex scene to be positively located and identified. Known systems, however, suffer from several problems, a principal one being obtaining exact spatial registration of the visual and infrared images. In systems which employ separate optical, detection and image processing and display systems for the visible and thermal-infrared spectral bands, some degree of parallax is unavoidable. Although overlaid multispectral images may be formed using digital image processing techniques, it is very difficult to achieve exact spacial registration in current systems. Also, digital processing of high resolution images is usually not performed in real time because of the extensive computations required. Even systems which have a common optical train have difficulty in achieving spatial registration of the images due to difficulty in focusing the widely separated visual and infrared wavelength bands.

It is desirable to provide composite visual/thermal-infrared imaging systems which avoid these and other problems of known systems, and it is to this end that the present invention is directed.

SUMMARY OF THE INVENTION

The invention affords an imaging system which provides a composite visible image and a thermal-infrared image of a scene with the visible and infrared images in exact spatial registration. The composite image may be displayed on a conventional color monitor, for example, as a high resolution black and white visible image with a false color step-tone or saturated white overlay of infrared highlights. To avoid a cluttered image, only infrared features with radiances within preset threshold limits may be displayed, and different discrete ranges of radiance values may be displayed as different colors, thereby enabling thermal features in a complex scene to be positively located and identified.

Briefly, in accordance with one aspect, the invention provides multispectral imaging apparatus comprising a wavelength-independent focus reflective optical system for receiving visible and infrared radiation from a scene and for focusing said radiation at a common focal plane; a detector responsive to both the visible and the infrared radiation disposed at the common focal plane, the detector providing first and second signals representative, respectively, of the visible and the infrared radiation received; and means responsive to said signals for displaying a composite image of the scene, the composite image comprising a visual image of the scene with portions of the image highlighted in accordance with the infrared radiation received from corresponding portions of the scene.

In another aspect, the invention affords a hybrid visible/infrared radiation detector which comprises a semiconductor substrate carrying a plurality of first visible radiation responsive elements arranged in a matrix and interspersed with a plurality of second infrared radiation responsive elements also arranged in a matrix to form an element array, and means for blocking visible radiation from the second elements. Preferably, the visible radiation responsive elements comprise P-N silicon photoconductor elements, and the infrared radiation responsive elements comprise metal silicide-silicon elements. The elements may be arranged in rows and columns of alternating first and second elements to form a spatial array of elements. Each element responds to the radiation impinging thereon and provides an output representative of the radiation emitted by a corresponding portion of the scene and from which output a corresponding pixel of the display is produced. The outputs from the first elements may be processed to produce a visual image of the scene, and the outputs of the second elements may be processed to highlight the visible image in accordance with the infrared radiation received from the scene.

In other forms, the detector may comprise first and second photoconductive films disposed on a substrate to form first and second diodes which are responsive, respectively, to only visible or infrared radiation and which are arranged in a matrix above silicon readout circuitry. The detector may also comprise an array of elements which are simultaneously responsive to both visible and infrared radiation, and the radiation impinging upon the array may be time multiplexed, as by employing a filter wheel, to produce two time-multiplexed visible and infrared images, rather than two spatially-multiplexed images.

DESCRIPTION OF THE PREFERRED EMBODIMENTS

The invention is particularly well adapted to providing composite visible/infrared images of objects or scenes, and will be described in that context. However, as will become apparent from the description which follows, this is illustrative of only one utility of the invention.

Figure 1:
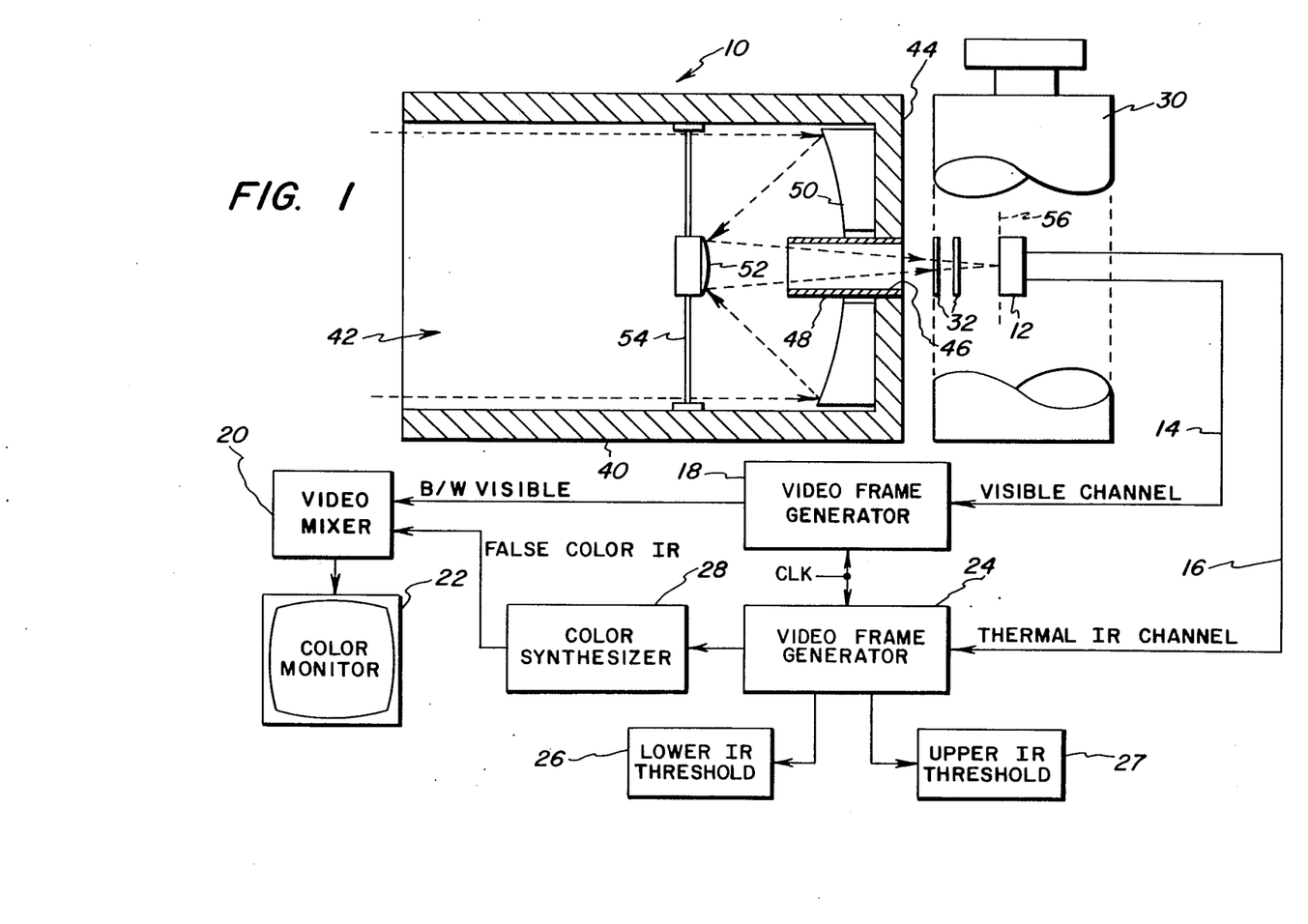
FIG. 1 is a schematic block diagram of a composite multispectral visible/thermal-infrared imaging system in accordance with the invention.

FIG. 1 illustrates a schematic block diagram of a composite visible/thermal-infrared imaging system in accordance with the invention. As shown, the system may comprise an optical system 10 for receiving visible and infrared radiation from an object or a scene and for focusing the radiation onto a multispectral detector 12 which may provide output signals on two separate channels 14 and 16 corresponding, respectively, to the visible radiation and to the thermal-infrared (IR) radiation. The output signals on the first channel, which correspond to the visible radiation impinging on the detector, may be supplied to a first video frame generator 18 which formats the raw signals from the detector into grey scale black and white (B/W) image frames and outputs a corresponding B/W video signal. The video output signals from video frame generator 18 may be supplied to a conventional video mixer 20 and then to a conventional color monitor 22 to display a visual image of the scene or object. Similarly, the raw signals on the second channel of the detector, which correspond to the infrared radiation impinging on the detector, may be supplied to a video frame generator 24 which converts the raw signals to grey scale black and white video signals which are synchronized with the video signals from frame generator 18.

Video frame generator 24 preferably includes an adjustable background threshold offset control 26, which enables adjustment of the lower sensitivity threshold of the infrared channel to a preselected value. This control advantageously allows low ambient temperature objects to be eliminated from the infrared display so that only objects or portions of a scene having temperatures greater than the preselected value, i.e., producing infrared radiation greater than a preselected amount, are displayed. This is convenient for avoiding cluttering of the resulting composite display. The video frame generator may also include a second background threshold control 27 for setting an upper cutoff level so that objects or portions of the scene having temperatures greater than another preselected value may be eliminated from the display. The two threshold controls 26 and 27 enable a "window" to be set so that only infrared signals within a preselected range between the upper and lower threshold limits are displayed. This is convenient for enabling objects or portions of a scene having temperatures within a predetermined temperature range to be highlighted on the display and to be easily identified. If desired, multiple threshold controls may be included to enable multiple infrared windows to be established.

The output video signal from video frame generator 24 is supplied to a conventional color synthesizer or color slicer 28 which converts different discrete ranges of the video signal into different colors to produce a step-tone false color (or saturated white) video signal corresponding to a color image of all objects within the field of view having infrared intensities above the selected threshold. The color video signal output from the color synthesizer is applied to video mixer 20, where it is combined with the B/W video signal from video frame generator 18 to produce on color monitor 22 a high resolution composite image. The composite image comprises a black and white visible image of the scene or object which is in exact spatial registration with an overlaid step-tone false color (or saturated white) thermal-infrared image. The composite image thus comprises a visual image of the scene or object which is highlighted by infrared features with radiances between the preset threshold limits. Of course, either image may be separately displayed, as well as supplied to other devices as needed for other purposes.

The video imaging portions of the system of FIG. 1 comprising the video frame generators, the color synthesizer, the video mixer and color monitor, may be implemented with standard commercially available devices. Both video frame generators, for example, may be substantially similiar and may comprise any commercially available device capable of producing standard NTSC or European Pal TV video frame signals. The background threshold controls 26 and 27 of video frame generator 24 may simply comprise voltage threshold controls such that only signals within the preset threshold range are converted to a video output. Similarly, color synthesizer 28 may be a commercially available device which converts the video signal from frame generator 24 into color video signals.

As will be described in more detail shortly, detector 12 may comprise a planar spatial array of a plurality of interspersed visible radiation sensitive and infrared sensitive elements arranged in a matrix. Each element produces an output in accordance with the radiation impinging thereon from a corresponding portion of the scene or the object, which output constitutes one pixel of the composite image. Detector 12 is preferably operated at cryogenic temperatures, preferably of the order of 77 Kelvin, for optimum infrared sensitivity. Accordingly, detector 12 may be disposed within a liquid nitrogen dewar 30 having windows 32 for admitting radiation. Alternatively, other cooling schemes, such as thermoelectric or Joule-Thompson refrigerators, may be employed for cooling the detector.

Optical system 10 of the system of FIG. 1 which receives radiation and focuses the radiation onto the detector comprises a wavelength-independent, non-catadioptric, non-refractive, reflective optical system. As shown in FIG. 1, optical system 10 is preferably a reflective Cassegrain telescope, the Cassegrain design being advantageous for compactness, comprising a cylindrical housing 40 having an entrance opening 42 for the radiation and a closed rear end 44 with a centrally located exit aperture 46 therein. A cylindrical tubular member 48 may extend inwardly into the housing from exit aperture 46 as shown. As indicated in the figure, radiation (indicated by the chain-dotted lines) entering opening 42 is reflected by an annular concave primary mirror 50 disposed within the housing adjacent to end 44 to a convex secondary mirror 52 supported at an intermediate location along the axis of the housing by a support structure 54. Radiation reflected from the secondary mirror passes through exit aperture 46 and is focused at a common focal plane 56 within the dewar at which detector 12 is located. The telescope may be focused by a mechanical focusing system (not illustrated) which moves both the primary and secondary mirrors such that both the visible and infrared images of the object or scene are brought to a common focus at the surface of the detector. The primary and secondary mirrors are preferably coated with gold or other suitable material which has optimum reflection characteristics at both visible and infrared wavelengths, preferably throughout the 0.4–14 micrometer wavelength range. Since the optical system is non-refractive, its focus is wavelength independent. Because of the widely separated visible and infrared wavelength bands and the necessity of focusing both the visible and infrared radiation at precisely the same focal plane, catadioptric (lens/mirror) and refractive optical systems are not suitable for the composite imaging system since the visible and infrared radiation would not be focused precisely at the same focal plane, which would cause problems in producing high resolution images that are in spatial registration.

Figure 2:
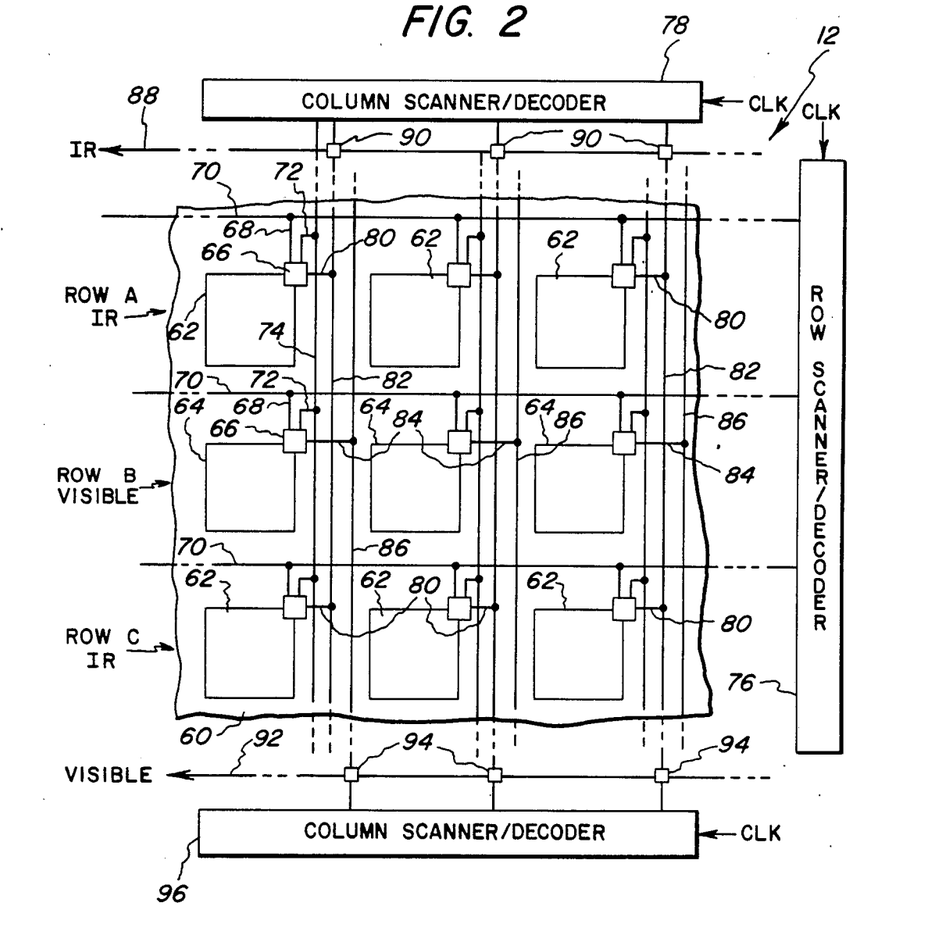
FIG. 2 is a diagrammatic view illustrating a portion of a hybrid visible/infrared detector array in accordance with the invention.

FIG. 2 illustrates diagrammatically a portion of a hybrid visible/thermal-infrared planar detector array 12 in accordance with the invention. The detector may comprise a substrate 60 which carries or has formed therein a plurality of interspersed infrared radiation responsive elements 62 and visible radiation responsive elements 64, preferably in alternating rows (or columns) of infrared elements and visible elements, as shown. As previously noted, each discrete element responds to the radiation impinging thereon and produces an output representative of the radiation emitted from a corresponding portion of the object or scene within the field of view of the optical system, and each output constitutes one pixel of the resulting image. To produce the visible and infrared images, the elements may be sequentially scanned row by row in a raster format to read the outputs of successive elements. These outputs constitute the raw signals which are supplied to the video frame generators of FIG. 1 to produce the visible and infrared images. To accomplish this, the detector array may include generally conventional read-out circuitry, such as charge coupled devices (CCD's) or FET's. FIG. 2 illustrates diagrammatically a preferred form of FET read-out circuitry, wherein a dual-gate FET 66 is carried by or formed in substrate 60 for each detector element 62 and 64. One gate (indicated by line 68) of the FET is connected to an associated row drive line 70, and the other gate (indicated by line 72) of the FET is connected to an associated column drive line 74. The row drive lines 70 may be connected to a row scanner/decoder 76, and the column drive lines 74 may be connected to a column scanner/decoder 78. The drains (indicated by lines 80) of the FET's 66 associated with infrared responsive elements 62 in a column may be connected to a common line 82, while the drains 84 of the FET's associated with the visible radiation responsive elements 64 in the column may be connected to another line 86. Each line 82 may be connected to a common infrared output line 88 by means of a gate, such as an FET, 90 which is controlled by the column scanner/decoder 78. Similarly, each line 86 may be connected to a common visible output line 92 by means of a gate or FET 94 which may be controlled by another column scanner/decoder 96.

Each radiation responsive element is read by controlling gates 68 and 72 of its associated FET 66 to turn the FET on. This supplies a voltage corresponding to the amount of radiation impinging upon the element to the line 82 or 86 connected to the drain 80 or 84 of the FET. The row and column scanner/decoders 76 and 78 control the row and column lines 70 and 74 to read sequentially each successive element, either row-by-row or column-by-column, for example. The successive outputs from the infrared radiation responsive elements 62 are applied to the infrared output line 88 via gates 90, and the successive outputs from the visible radiation responsive elements 64 are applied to the visible output line 92 via gates 94.

Since, in the form illustrated in FIG. 2, the detector comprises alternating rows of infrared radiation responsive and visible radiation responsive elements (Rows A and C being infrared radiation responsive and Row B being visible radiation responsive), and since the infrared and visible radiation responsive elements are read out to separate lines, 82 and 86, respectively, row scanner/decoder 76 may simultaneously activate the row lines 70 associated with Rows A and B and column scanner/decoder 78 may successively step from one column to the next to simultaneously read out the infrared and visible radiation responsive elements in Rows A and B of the same column. This will simplify synchronization of the visible and infrared signals. The scanner/decoders may comprise shift registers, for example, which are driven by outputs from a master clock (CLK). As each stage turns on, it controls an associated column or row read line and turns on an associated gate 90 or 94. Also, although column scanner/decoder 78 is illustrated in FIG. 2 as controlling the column lines of both the infrared and the visible radiation responsive elements and a separate column scanner/decoder 96 is illustrated for controlling gates 94 to output the visible signals, it will be apparent to those skilled in the art that column scanner/decoder 78 may also control gates 94, thus eliminating the need for column scanner/decoder 96. Furthermore, if desired, column scanner/decoder 96 may be used for independently controlling a separate column line connected to the visible radiation responsive elements. In any event, as will be appreciated, it is desirable to synchronize the scanning of the elements and the video frame generators, which may be accomplished by using a common master clock, for example. It will also be apparent to those skilled in the art that while the detector elements of each row of the detector array of FIG. 2 are the same and the rows alternate, other patterns of detector elements, such as a checkerboard pattern, may be used.

Detector elements 62 and 64 are preferably semiconductor or thin-film elements, and detector array 12 is preferably formed using large scale or very large scale integration techniques. Since each element corresponds to one pixel of the composite display, it is desirable that the detector array 12 comprise a large number of elements and, of course, that the elements be made as small as possible to afford a compact device. The number of elements included in the detector array will depend upon the desired resolution. Naturally, the greater the number of elements, the higher the resolution. Also, the read circuitry comprising FET's 66, gates 90 and 94 and the scanner/decoders may also be fabricated on substrate 60 as part of the integrated circuit, as is well known.

Figure 3:
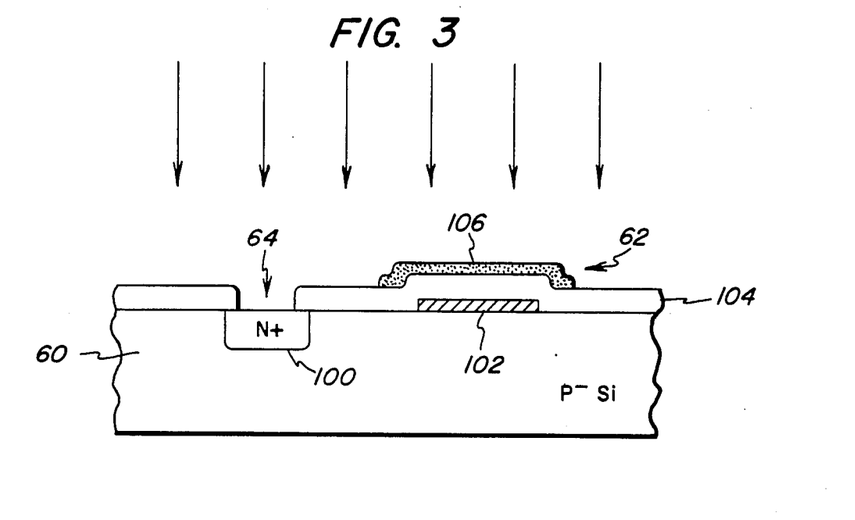
FIG. 3 is a cross-sectional view of a portion of a first embodiment of a detector array in accordance with the invention.

FIG. 3 is a cross-sectional view of a portion of a first embodiment of a detector array 12 in accordance with the invention. In FIG. 3 and subsequent figures which illustrate other embodiments of the detector array, the read circuitry has been omitted for clarity. As shown in FIG. 3, the detector array may comprise a P-type silicon substrate having an N-type region 100 therein to form a visible radiation responsive P-N photodiode 64. The infrared radiation responsive element 62 may comprise a metal silicide-to-silicon Schottky barrier diode (SBD) formed by depositing a layer 102 of metal such as platinum on the silicon substrate and reacting it to form the silicide. A dielectric layer 104, as of silicon dioxide or silicon nitride, may be deposited on the substrate over the layer 102 and partially covering the P-N photodiode, as shown. Metal layer 102 may then be covered with a visible radiation blocking filter 106, as of amorphous silicon. Amorphous silicon is advantageous as a visible radiation blocking filter since it can be put down at low temperatures which will not disturb previously deposited layers. The P-N photodiode need not be provided with an infrared radiation blocking filter since it cuts off at a wavelength of the order of 1.1 microns and has no significant infrared radiation response.

As shown in FIG. 3, the detector is adapted to be illuminated with visible and infrared radiation (indicated by the arrows in the figure) from the front side, i.e., from the top in the figure. Photodiode 64 responds to the visible radiation impinging thereon and produces a corresponding output voltage, and the metal silicide-to-silicon SBD responds to the infrared radiation passing through layer 106 to produce an output voltage in accordance with the radiation impinging on layer 102.

Figure 4:
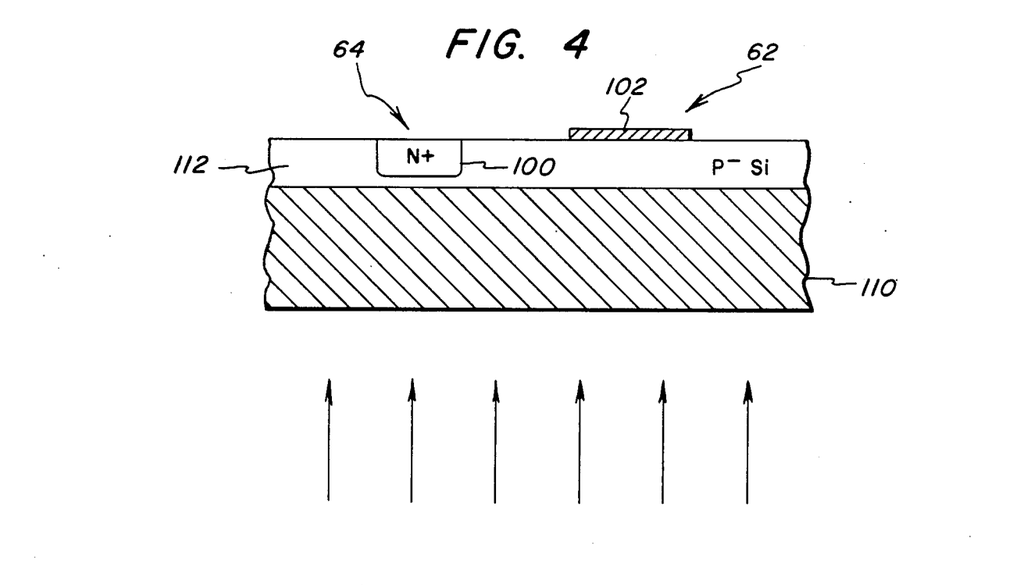
FIG. 4 is a cross-sectional view of a portion of a second embodiment of a detector array in accordance with the invention.

FIG. 4 illustrates a second embodiment of a detector in accordance with the invention which affords enhanced Schottky diode efficiency by employing backside illumination, i.e., through the substrate. Since a silicon layer of any substantial thickness will block visible light from reaching the P-N photodiode, the detector of FIG. 4 employs a substrate 110 which is transparent to both visible and infrared radiation, such as of sapphire, and a thin epitaxial layer of P-type silicon 112 is deposited on substrate 110. An N-type region is formed in the epitaxial layer to produce a P-N photodiode 64, and a metal layer 102 is deposited on top of the epitaxial layer and reacted to form the Schottky diode. Since silicon becomes transparent at wavelengths of the order of 2.0 microns, the infrared radiation passes easily through the sapphire substrate and the silicon layer 112 to the Schottky diode 62. By appropriately adjusting the thickness of the epitaxial layer, the visible radiation can be substantially blocked from reaching the Schottky diode. The bias voltage of the P-N photodiode 64 may be adjusted to control its depletion region and to optimize its sensitivity to the visible radiation. The disadvantage of the high dark current levels normally encountered at room temperature with silicon-on-sapphire structures is avoided by operating the detector at liquid nitrogen temperatures of the order previously noted, for example.

Figure 5:
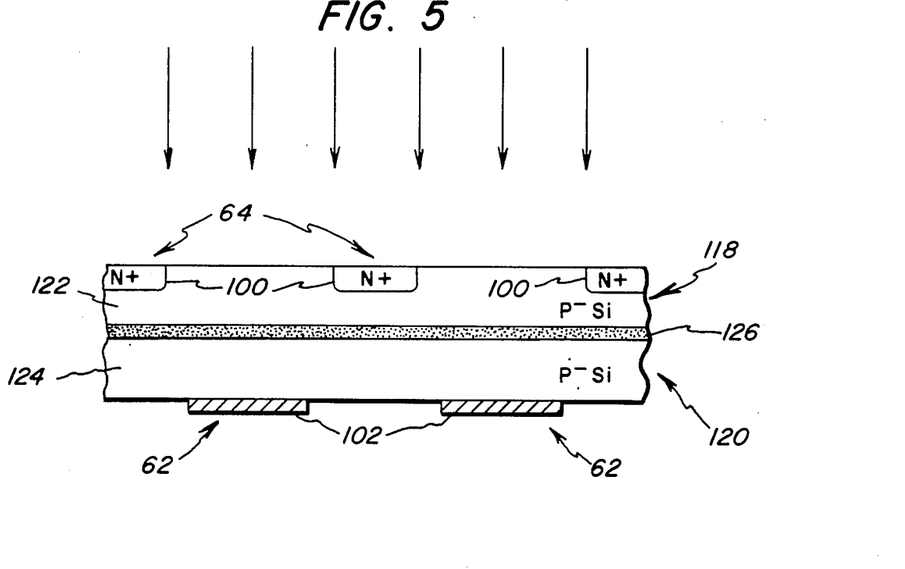
FIG. 5 is a cross-sectional view of a portion of a third embodiment of a detector array in accordance with the invention.

FIG. 5 illustrates a third embodiment of a detector in accordance with the invention, wherein a conventional P-N photodiode visible radiation detector array 118 and a conventional Schottky diode infrared detector array 120 are formed on separate silicon substrates 122 and 124, respectively, which are placed back-to-back in a sandwich configuration, as shown in the figure, with the photodiode array 118 facing the radiation impinging on the front side of the detector. The silicon substrates 122 and 124 serve to block visible radiation from reaching the Schottky diodes 62, which are formed on the back side of the detector. If desired, an additional filter layer 126 of a spectrally selective material may be included in the sandwich configuration between the substrates. This allows the sensitivity and yield of each detector array to be maximized, although it does result in somewhat higher packaging complexity and system cost.

Figure 6:
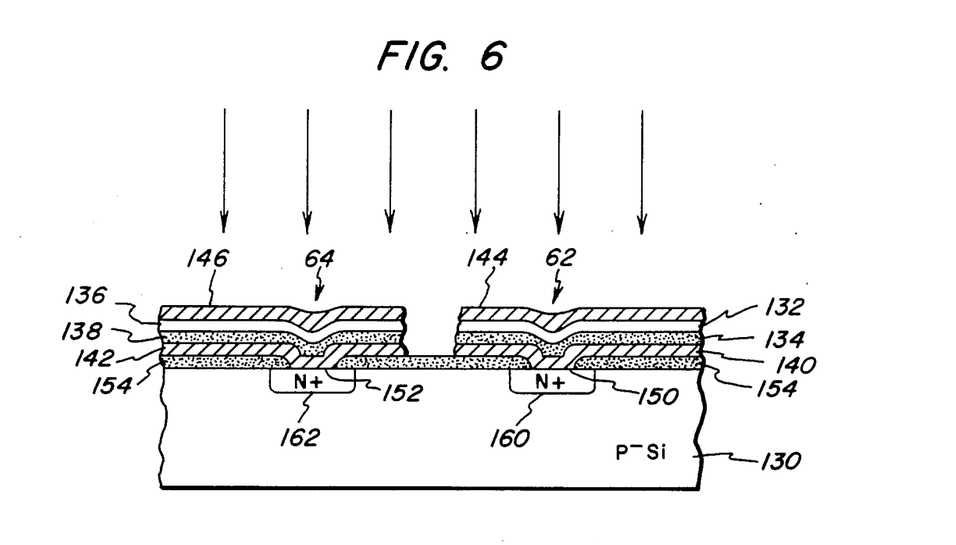
FIG. 6 is a cross-sectional view of a portion of a fourth embodiment of a detector array in accordance with the invention.

FIG. 6 illustrates a fourth embodiment of a detector in accordance with the invention which employs heterojunction thin-film photoconductive sensors. As shown in the figure, the infrared radiation responsive element 62 and the visible radiation responsive element 64 may each be formed as a multilayer structure on a substrate 130, as of P-type silicon. Each detector may comprise two thin-film photoconductive layers (132 and 134 for detector element 62, and 136 and 138 for detector element 64) which are in electrical contact with each other to form a diode. The lowermost thin-film layer of each element is in electrical contact with a metal layer 140 or 142, which serves as one electrode of the diode, and the uppermost thin-film layers are in electrical contact with another metal layer 144 or 146, which forms the other electrode of the diode. Metal layers 144 and 146, which are the outermost layers and face the incident radiation, are formed of a material which is transparent to both the visible and infrared radiation, such as indium tin oxide. The lower metal layers 140 and 142 are insulated from substrate 130, except at 150 and 152, respectively, by a layer of dielectric material 154. The read-out circuitry for the detector elements, which may be conventional FET devices such as previously described in connection with FIG. 2 or charge coupled devices (CCD's), may be embodied in substrate 130, and the lowermost metal electrodes 140 and 142 of detector elements 62 and 64 may be in electrical contact with corresponding read-out devices 160 and 162, respectively at points 150 and 152. (For simplicity, FIG. 6 illustrates only a portion of such read-out devices 160 and 162.) The uppermost metal layers 144 and 146 may be connected together to form a common terminal for the detector array.

The two thin-film photoconductive layers of each detector element may be of generally similar but different materials which are selected to afford a predetermined barrier height so that the element is responsive only to radiation within a predetermined spectral wavelength band, such as visible or infrared, and such that the element generates photoelectrons which have sufficient energy to cross the junction and change the reverse bias on the diode. The read-out devices act as switches which may be sequentially turned on, as previously described, to read the amount of photogenerated charge of each element and reset the diode reverse bias, similar to reading out a metal silicide-silicon Schottky diode or a P-N silicon junction diode. The structure of each detector element may be similar to the thin-film photoconductor disclosed, for example, in Terui, Y., et al, "A Solid-State Color Image Sensor Using ZnSe-$Zn_{1-x}Cd_xTe$ Heterojunction Thin-film Photoconductor", IEEE ISSCC 80 Digest of Technical Papers, p.34-35; Feb. 1980, except for the selection of the thin-film materials to give the desired response.

Figure 7:
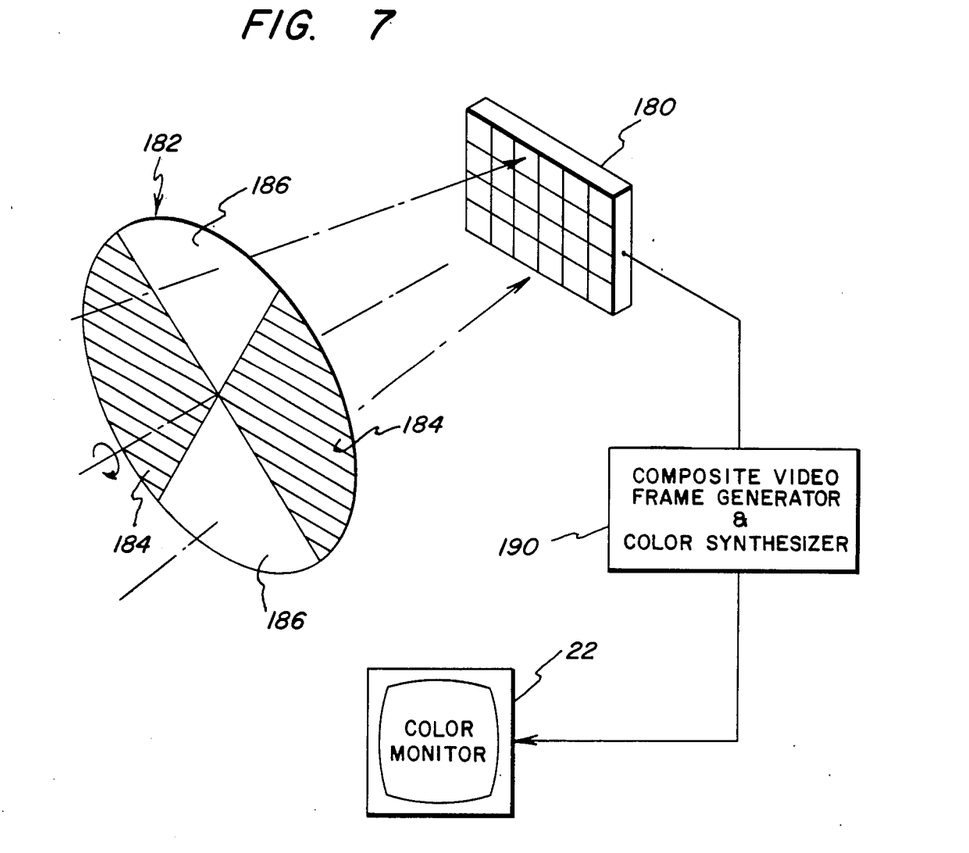
FIG. 7 is a diagrammatic view of another embodiment of an imaging system in accordance with the invention for producing time-multiplexed images.

FIG. 7 illustrates another form of a visible/infrared imaging system in accordance with the invention. The system of FIG. 7 differs from that of FIG. 1 in that it employs a detector array 180 comprising elements which are sensitive to both visible radiation as well as infrared radition, and the detector array produces time-multiplexed visible and infrared signals on a single channel, rather than spatially-multiplexed visible and infrared signals on different channels. Detector array 180 is preferably front side illuminated and may comprise an array of Schottky barrier diodes of the type illustrated in FIG. 3, but without the visible radiation blocking filter layer 106, or the detector may comprise a conventional bandgap type detector. The visible and infrared radiation impinging on the detector array may be time-multiplexed to the detector array by disposing in front of the detector array a rotating filter wheel 182 having alternating filter segments 184 and 186 which constitute bandpass filters for transmitting, respectively, only infrared and only visible radiation. The output from the detector array may be supplied to a composite video frame generator and color synthesizer 190, which provides video signals to color display 22. The rate of rotation of the color wheel may be selected and synchronized with the composite video frame generator and the color synthesizer such that a visible image and an infrared image are displayed as alternate frames on display 22. As in the system of FIG. 1, the visible image may be displayed as a black and white image, and the infrared image may be displayed as a false color image.

While preferred embodiments of the invention have been shown and described, it will be appreciated by those skilled in the art that changes may be made in these embodiments without departing from the principles and the spirit of the invention, the scope of which is defined in the appended claims.

What we claim as new and desire to secure by Letters Patent of the United States is:

1. Multispectral imaging apparatus comprising a wavelength-independent focus reflective optical system for receiving visible and infrared radiation from a scene and for focusing the visible and infrared radiation at a common focal plane; detector means responsive to both the visible and the infrared radiation focused at the common focal plane, the detector means providing first and second signals representative, respectively, of the visible and the infrared radiation received by the detector means; and means responsive to the first and second signals for displaying a composite image of the scene, the composite image comprising a black and white visual image of the scene with portions of the image highlighted in color in accordance with the infrared radiation received from corresponding portions of the scene.

2. The apparatus of claim 1, wherein the optical system is non-refractive.

3. The apparatus of claim 1, wherein the optical system comprises a reflective Cassegrain telescope having moveable primary and secondary mirrors for focusing.

4. The apparatus of claim 1, wherein the displaying means comprises means for converting the first signal into a first video signal corresponding to a black and white visual image of the scene, means for converting the second signal into a second video signal corresponding to a color infrared image of the scene, third means for combining the first and second video signals to produce a composite video signal, and a color display receiving the composite video signal for displaying said composite image.

5. The apparatus of claim 4, wherein the means for converting the second signal includes means for setting one or more preselected threshold levels such that only a second signal which corresponds to infrared radiation within a preselected intensity range is converted to the second video signal.

6. The apparatus of claim 4, wherein the means for converting the second signal comprises means for converting discrete ranges of the second signal to different colors.

7. The apparatus of claim 1, wherein the detector means comprises a spatial array of detector elements responsive to both the visible and the infrared radiation, and means for time multiplexing the visible and infrared radiation focused onto the array such that the first and second signals are time multiplexed.

8. Multispectral imaging apparatus comprising a hybrid visible/infrared radiation detector, the detector comprising a semiconductor substrate carrying a plurality of first and second radiation responsive elements, the first and second elements being spatially arranged on the substrate in a matrix such that the first and second elements are interspersed, the first elements being responsive to visible radiation and the second elements being responsive to infrared radiation, and means for providing first and second output signals from the first and second elements, respectively, the first output signal being representative of visible radiation impinging on the first elements and the second output signal being representative of infrared radiation impinging on the second elements.

9. The apparatus of claim 8, wherein said substrate comprises silicon, and wherein said first elements comprise P-N photodiodes and said second elements comprise metal silicide Schottky diodes.

10. The apparatus of claim 9, further comprising a visible radiation blocking material selectively patterned on the substrate to cover only the Schottky diodes.

11. The apparatus of claim 10, wherein said visible radiation blocking material comprises amorphous silicon.

12. The apparatus of claim 9, wherein said silicon substrate comprises an epitaxial layer of silicon on another substrate of material which is visible and infrared radiation transmissive, the visible and infrared radiation impinging upon the elements being transmitted to the elements through said other substrate.

13. The apparatus of claim 12, wherein said other substrate comprises sapphire.

14. The apparatus of claim 9, wherein the P-N photodiodes are disposed on a front face of the silicon substrate and the metal silicide diodes are disposed on a rear face of the silicon substrate, and wherein the front face faces the visible and infrared radiation impinging on the elements.

15. The apparatus of claim 14, wherein the substrate includes an intermediate layer of a spectrally selective material disposed between the front and rear faces.

16. The apparatus of claim 8, wherein the first and second elements comprise heterojunction thin-film photoconductive sensors.

17. The apparatus of claim 8, wherein said providing means comprises means for selectively reading out from each of said elements a signal corresponding to the radiation impinging upon such element.

18. The apparatus of claim 17, wherein said selective reading means comprises, for each of said first and second elements, means for scanning successive elements and for providing simultaneously the first and second signals as separate output signals.

19. The apparatus of claim 8 further comprising means for converting the first output signal into a visible image corresponding to the visible radiation impinging upon the detector, means for converting the second output signal into an infrared image corresponding to the infrared radiation impinging upon the detector, and means for combining the visible and infrared images to produce a composite image.

20. The apparatus of claim 8 further comprising a wavelength-independent focus reflective optical system for receiving the visible and the infrared radiation and for focusing the radiation onto the detector.

21. Multispectral imaging apparatus comprising a wavelength-independent focus reflective optical system for receiving visible and infrared radiation from a scene and for focusing the visible and infrared radiation at a common focal plane; detector means responsive to both the visible and the infrared radiation focused at the common focal plane, the detector means providing first and second signals representative, respectively, of the visible and the infrared radiation received by the detector means, the detector means comprising a spatial array of first and second interspersed detector elements arranged in a matrix on a substrate, the first detector elements being responsive to the visible radiation and producing the first signal, the second detector element being responsive to the infrared radiation and producing the second signal; and means responsive to the first and second signals for displaying a composite image of the scene, the composite image comprising a black and white visual image of the scene with portions of the image highlighted in color in accordance with the infrared radiation received from corresponding portions of the scene.

22. Multispectral imaging apparatus comprising a wavelength-independent focus reflective optical system for receiving visible and infrared radiation from a scene and for focusing the visible and infrared radiation at a common focal plane; detector means responsive to both the visible and the infrared radiation focused at the common focal plane, the detector means providing first and second signals representative, respectively, of the visible and the infrared radiation received by the detector means, the detector means comprising a spatial array of first and second interspersed detector elements arranged in a matrix on a silicon substrate, the first detector elements being responsive to the visible radiation and producing the first signal, the second detector element being responsive to the infrared radiation and producing the second signal, and the first detector elements comprise P-N diodes and the second detector elements comprise metal silicide diodes; and means responsive to the first and second signals for displaying a composite image of the scene, the composite image comprising a black and white visual image of the scene with portions of the image highlighted in color in accordance with the infrared radiation received from corresponding portions of the scene.

23. Multispectral imaging apparatus comprising a wavelength-independent focus reflective optical system for receiving visible and infrared radiation from a scene and for focusing the visible and infrared radiation at a common focal plane; detector means responsive to both the visible and the infrared radiation focused at the common focal plane, the detector means providing first and second signals representative, respectively, of the visible and the infrared radiation received by the detector means, the detector means comprising a spatial array of first and second interspersed detector elements arranged in a matrix on a silicon substrate, the first detector elements being responsive to the visible radiation and producing the first signal, the second detector element being responsive to the infrared radiation and producing the second signal, the first and second detector elements comprise thin film diodes; and means responsive to the first and second signals for displaying a composite image of the scene, the composite image comprising a black and white visual image of the scene with portions of the image highlighted in color in accordance with the infrared radiation received from corresponding portions of the scene.

24. Multispectral imaging apparatus comprising a wavelength-independent focus reflective optical system for receiving visible and infrared radiation from a scene and for focusing the visible and infrared radiation at a common focal plane; detector means responsive to both the visible and the infrared radiation focused at the common focal plane, the detector means providing first and second signals representative, respectively, of the visible and the infrared radiation received by the detector means, the detector means comprising a spatial array of first and second interspersed detector elements arranged in a matrix on a substrate, the first detector elements being responsive to the visible radiation and producing the first signal, the second detector element being responsive to the infrared radiation and producing the second signal, the detector means further comprises first means for scanning the first detector elements and for providing the first signal on a first output channel, and second means for scanning the second detector elements and for providing the second signal on a second output channel; and means responsive to the first and second signals for displaying a composite image of the scene, the composite image comprising a black and white visual image of the scene with portions of the image highlighted in color in accordance with the infrared radiation received from corresponding portions of the scene.

25. Multispectral imaging apparatus comprising a wavelength-independent focus reflective optical system for receiving visible and infrared radiation from a scene and for focusing the visible and infrared radiation at a common focal plane; detector means responsive to both the visible and the infrared radiation focused at the common focal plane, the detector means providing first and second signals representative, respectively, of the visible and the infrared radiation received by the detector means, the detector means comprising a spatial array of first and second interspersed detector elements arranged in a matrix on a substrate, the first detector elements being responsive to the visible radiation and producing the first signal, the second detector element being responsive to the infrared radiation and producing the second signal, the detector means further comprises first means for scanning the first detector elements and for providing the first signal on a first output channel, and second means for scanning the second detector elements and for providing the second signal on a second output channel, the second means including threshold adjusting means for setting one or more preselected threshold levels such that only a second signal that is within predetermined threshold limits is displayed; and means responsive to the first and second signals for displaying a composite image of the scene, the composite image comprising a black and white visual image of the scene with portions of the image highlighted in color in accordance with the infrared radiation received from corresponding portions of the scene.

* * * * *